(12) United States Patent
Lee et al.

(10) Patent No.: US 12,305,973 B2
(45) Date of Patent: May 20, 2025

(54) AUTOMATED SEAL INSPECTION SYSTEM

(71) Applicant: Caterpillar Inc., Peoria, IL (US)

(72) Inventors: Nien L. Lee, Peoria, IL (US); Nicholas S. Craven, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 291 days.

(21) Appl. No.: 17/667,639

(22) Filed: Feb. 9, 2022

(65) Prior Publication Data

US 2023/0251080 A1 Aug. 10, 2023

(51) Int. Cl.
*G01B 11/24* (2006.01)
*H04N 23/00* (2023.01)

(52) U.S. Cl.
CPC .............. *G01B 11/24* (2013.01); *H04N 23/00* (2023.01)

(58) Field of Classification Search
CPC .................................. G01B 11/24; H04N 23/00
See application file for complete search history.

(56) References Cited

U.S. PATENT DOCUMENTS

| | | | |
|---|---|---|---|
| 4,634,273 A * | 1/1987 | Farleman | G01N 21/95 356/73 |
| 5,619,587 A | 4/1997 | Willoughby, Jr. et al. | |
| 9,682,441 B2 | 6/2017 | Thorson et al. | |
| 10,620,132 B2 * | 4/2020 | Sitko | G01N 21/9515 |
| 10,832,395 B2 | 11/2020 | Drescher et al. | |
| 2011/0080588 A1 | 4/2011 | Segall | |
| 2019/0257763 A1 | 8/2019 | Sitko et al. | |

FOREIGN PATENT DOCUMENTS

| | | |
|---|---|---|
| CN | 207675138 U | 7/2018 |
| EP | 2280270 | 9/2015 |
| JP | 3205511 B2 | 9/2001 |
| JP | 3205511 | 7/2016 |
| WO | 2013012106 | 1/2013 |

OTHER PUBLICATIONS

"Images of seal inspection system used confidentially by Caterpillar to inspect seals in Aug. 2020", 4 pgs , (Aug. 2020), 4 pgs.
Written Opinion and International Search Report for Int'l. Patent Appln. No. PCT/US2023/060704, mailed Apr. 28, 2023 (12 pgs).

* cited by examiner

*Primary Examiner* — Tri T Ton

(57) ABSTRACT

A seal ring inspection system may include a chuck system configured for securing a seal ring and an inspection tool framework arranged about the chuck system and configured to adjustably support a plurality of inspection tools relative to the seal ring. The system may also include a plurality of inspection tools adjustably arranged on the inspection tool framework including an imaging device and a plurality of laser scanners. The plurality of laser scanners may also include a surface laser scanner and a pair of diagonally directed profile laser scanners collectively configured for capturing a full profile of the seal ring.

18 Claims, 11 Drawing Sheets

AUTOMATED SEAL INSPECTION SYSTEM

TECHNICAL FIELD

The present application relates generally to inspection systems. More particularly, the present application relates to automated image and laser inspection systems for machine parts. Still more particularly, the present application relates to a rotational support for securing a seal and an adjustable camera and laser scanner configured to image/scan the seal during rotation of the seal.

BACKGROUND

Seals or other parts of a machine may often be manufactured to particular specifications that identify one or more dimensions and tolerances for variance from those dimensions. Manufacturers may employ systems to verify that the parts meet the specification. These systems may be in house systems where inspection or verification is performed in house or the systems may be provided and/or operated by third parties where the inspection or verification is performed by a third party.

Depending on the nature of the inspection, the inspection can be time consuming and/or costly. For example, a coordinate-measuring machine (CMM) can be used to measure the geometry of physical objects by sensing discrete points on the surface of the object with a probe or stylus. That is, a manufactured part may be placed on an inspection table about which the probe of the CMM can move. The probe may essentially "feel" its way around the manufactured part making note of the coordinates of the several points it passes through as the probe passes across the one or more surfaces of the object. The CMM process may generate a three-dimensional digital model of the part, which can be compared to intended or specified tolerances of the part. In the case of seals or, more particularly, metal face seals or duo cone seals, the inspection machine run time for a CMM system may range from 10-15 minutes or even up to 60 minutes depending on the amount of detail that is desired, for example.

Japanese Patent 3,205,511 relates to a seal-inspection apparatus for inspecting both sides of a seal smoothly and surely. The seals are sequentially suppled and placed on a transparent plate 4 (turntable), and a solid-state imaging element camera 10, 10, is installed on the upper and lower sides of the transparent plate 4, respectively, and simultaneously images on both sides of the transparent plate 1 are obtained, and an image is processed by an image processor.

SUMMARY

In one or more examples, a seal ring inspection system may include a chuck system configured for securing a seal ring for rotation about a center point and an inspection tool framework arranged about the chuck system and configured to adjustably support a plurality of inspection tools relative to the seal ring. The system may also include a plurality of inspection tools adjustably arranged on the inspection tool framework. The inspection tools may include an imaging device arranged above the chuck system and directed downward to capture an image of a sealing surface of the seal ring arranged on the chuck system. The inspection tools may also include a plurality of laser scanners configured for capturing spatial data about the seal ring. The plurality of laser scanners may also include a surface laser scanner arranged above the chuck system and directed downward to capture spatial bandwidth data of the sealing surface of the seal ring arranged on the chuck system. The plurality of laser scanners may also include a pair of diagonally directed profile laser scanners collectively configured for capturing a full profile of the seal ring.

In one or more examples, a method for inspecting a seal ring may include receiving or obtaining a seal ring dimension indicative of the seal ring size, adjusting a position of a carriage supporting an imaging device and adjusting a position of a carriage supporting a surface laser scanner and a pair of profile laser scanners. The method may also include operating a turntable to rotate the seal ring relative to the imaging device and the plurality of laser scanners. The method may also include, using the imaging device, capturing image data of a sealing surface of the seal ring during the operating of the turntable. The method may also include, using the surface laser scanner, capturing spatial bandwidth data of the sealing surface of the seal ring during the operating of the turntable. The method may also include, using the pair of profile laser scanners, capturing spatial profile data of a cross-sectional profile of the seal ring. The method may also include comparing at least one of the spatial bandwidth data and the spatial profile data to a specified value and determining whether the at least one of the spatial bandwidth data and the spatial profile data fails or meets the specified value.

In one or more examples, a seal ring inspection system may include a plurality of means for capturing data. The plurality of means for capturing data, may include a means for capturing image data of a sealing surface of a seal ring, a means for capturing spatial data of the sealing surface of the seal ring, and a pair of means for capturing spatial data of a cross-sectional profile of the seal ring. The system may also include a means for securing and rotating a seal ring about a center point, a means for adjustably supporting the plurality of means for capturing data relative to the means for securing and rotating the seal ring, and a control means for rotating the seal ring with the means for securing and rotating and scanning the seal ring with the plurality of means for capturing data.

DETAILED DESCRIPTION

Figure 1:
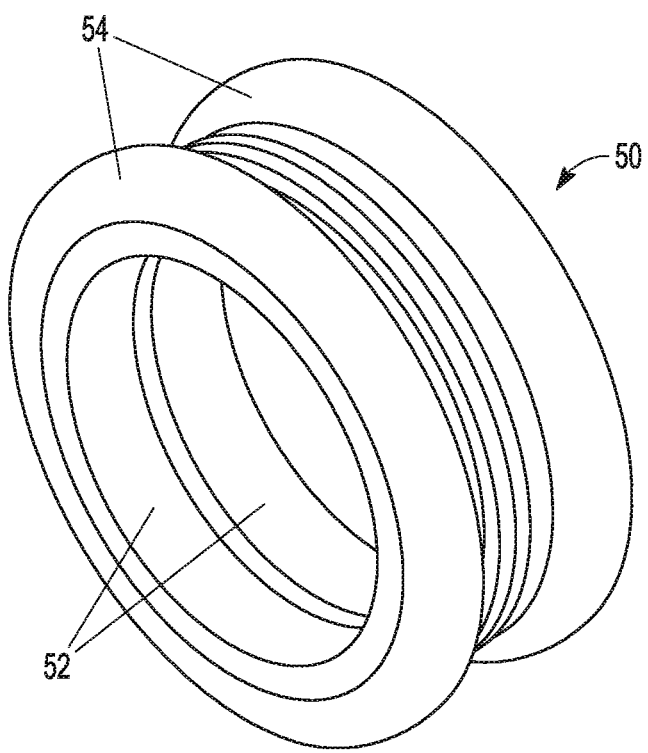
FIG. 1 is a perspective view of a duo cone or metal face seal, according to one or more embodiments.

FIG. 1 is a perspective view of a seal 50 and, in particular, a metal face seal or duo cone seal suitable for use on a work machine. As shown, the seal 50 may include a pair of metal sealing rings 52 and a pair of resilient backing elements 54 such as O-rings or trapezoidal elastomer rings (e.g., Belleville washers). In one or more examples, a metal face seal may be used in relatively harsh environments where there is risk of exposure to abrasive materials such as sand, soil, mud, or gravel or where there is risk to water, harsh chemicals, or other intrusive items that may otherwise degrade or wear out less robust seals.

Figure 2:
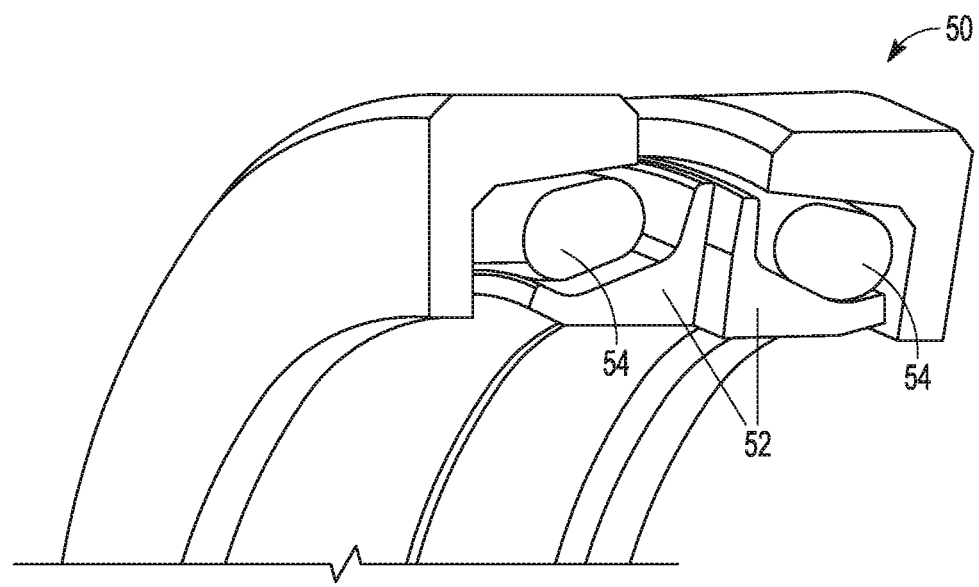
FIG. 2 is a perspective cross-sectional view thereof and including respective housings.
Figure 3:
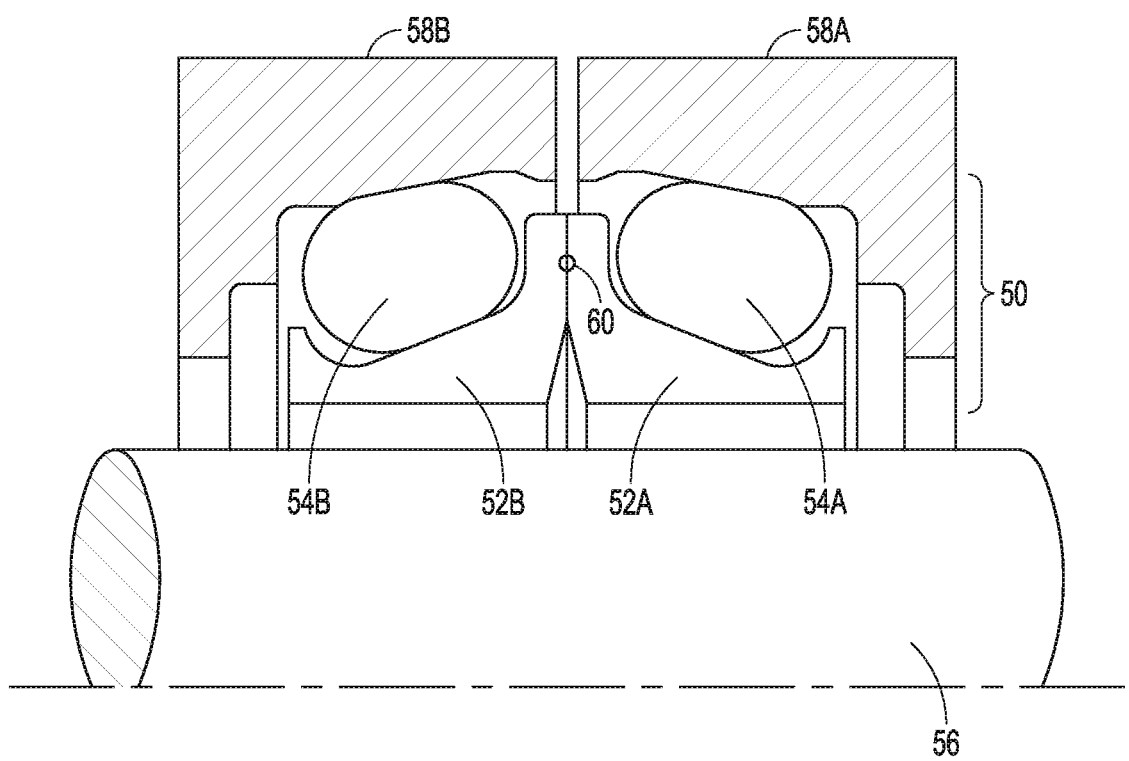
FIG. 3 is a cross-sectional view thereof.

As shown in FIG. 2, each half of the seal 50 may be installed in respective portions of a machine where the respective portions of the machine may be adapted for relative rotation. For example, a metal face seal may be used to maintain oil within a final drive motor while keep damaging contamination out. As shown in FIG. 3, the seal 50 may be arranged on a drive shaft 56 extending from a final drive motor out of a primary housing 58A and into a rotating housing 58B. The drive shaft 56 may be rotated relative to the primary housing 58A and may be keyed or otherwise secured to the rotating housing 58B to cause the rotating housing 58B to rotate with the drive shaft 56. As mentioned, the portion of the seal 50 on the primary housing 58A may remain stationary and the portion of the seal 50 on the rotating housing 58B may rotate with the rotating housing 58B. That is, the primary housing 58A and all aspects of the primary housing side of the seal (e.g., seal ring 52A and O-ring 54A) may remain stationary while the rotating housing 58B and all aspects of the rotating housing side of the seal (e.g., seal ring 52B and O-ring 54B) may rotate. As such, a relative rotation joint 60 may exist where the metal face seals 52A/52B contact one another.

With further reference to FIG. 3, it is to be appreciated that the circumferential shape of each seal ring may prevent or resist motion of the seal ring away from the housing in a radial direction. In the longitudinal direction, each face seal may abut the opposing face seal preventing or resisting motion of the seal ring out of the housing. On the back side of the seal ring, the resilient backing element may bias the seal ring out of the housing and against the opposing seal ring. Moreover, some level of pre-compression of the resilient backing element may occur at installation and, as such, when the seal rings wear, the resilient backing element may make up for the loss in thickness by biasing the ring out of the housing.

Figure 4:
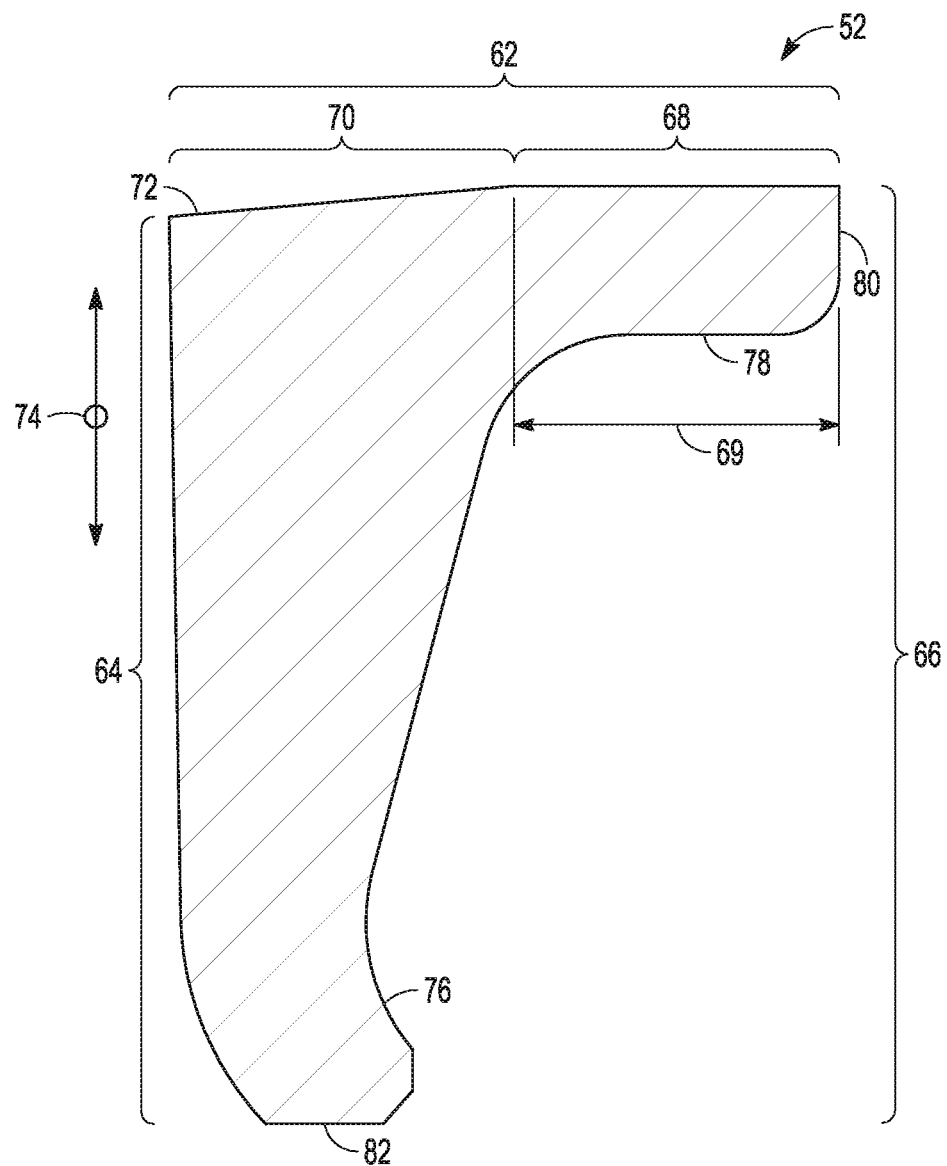
FIG. 4 is a cross-sectional profile view of a seal ring of the seal of FIGS. 1-3, according to one or more embodiments.

Turning now to FIG. 4, a cross-sectional profile of a seal ring 52 is shown. As shown, the seal ring 52 may include a generally L-shaped element having a sealing face 62, an inner face 64, and a resilient backing element interface 66. The sealing face 62 may include a seal surface 68 having a bandwidth 69 and a retreating surface 70 may extend substantially radially inward to an inner corner 72. This retreating surface 70 may extend at a slightly longitudinally rearward angle relative to the seal surface 68. The inner face 64 may extend substantially longitudinally rearward from the inner corner 72 generally orthogonally relative to the retreating surface 70. The inner face 64 may extend at a slightly radially outward angle relative to the longitudinal direction 74. The resilient backing element interface 66 may include a substantially conical surface opposite and radially outward from the inner face 64. The resilient backing element interface 66 may include a hook 76 at a longitudinally rearward end and a buttress wall 78 at a longitudinally forward end. An outside return 80 may be provided between the buttress wall and the seal face and a rear return 82 may be provided between the hook and the inner face.

It may be appreciated that manufacturing tolerances for the seal rings 52 may be relatively stringent to provide for full and uniform contact of the sealing surfaces 68 of the pair of seal rings 52 when in use. Moreover, as the seal rings 52 become large (e.g., 12"-50") various additional factors may come into play relating to warpage of seal rings 52 or other dimensional variances that result from the relatively large circular part with a relatively narrow cross-section. In particular, larger seal rings 52 may have tolerance specifications relating to the bandwidth of the sealing surface 68, surface imperfections of the sealing surface 68 and multiple other dimensions of the ring's cross-sectional profile. This is contrast to smaller seal rings, which may have tolerance specifications for the bandwidth and surface imperfections of the sealing surface 68, but no additional profile dimensions. These larger seal rings may be very time consuming to inspect and, as discussed above, can involve inspection machine run times of 10-15 minutes per part or even up to 60 minutes when higher levels of detail are desired.

Figure 5:
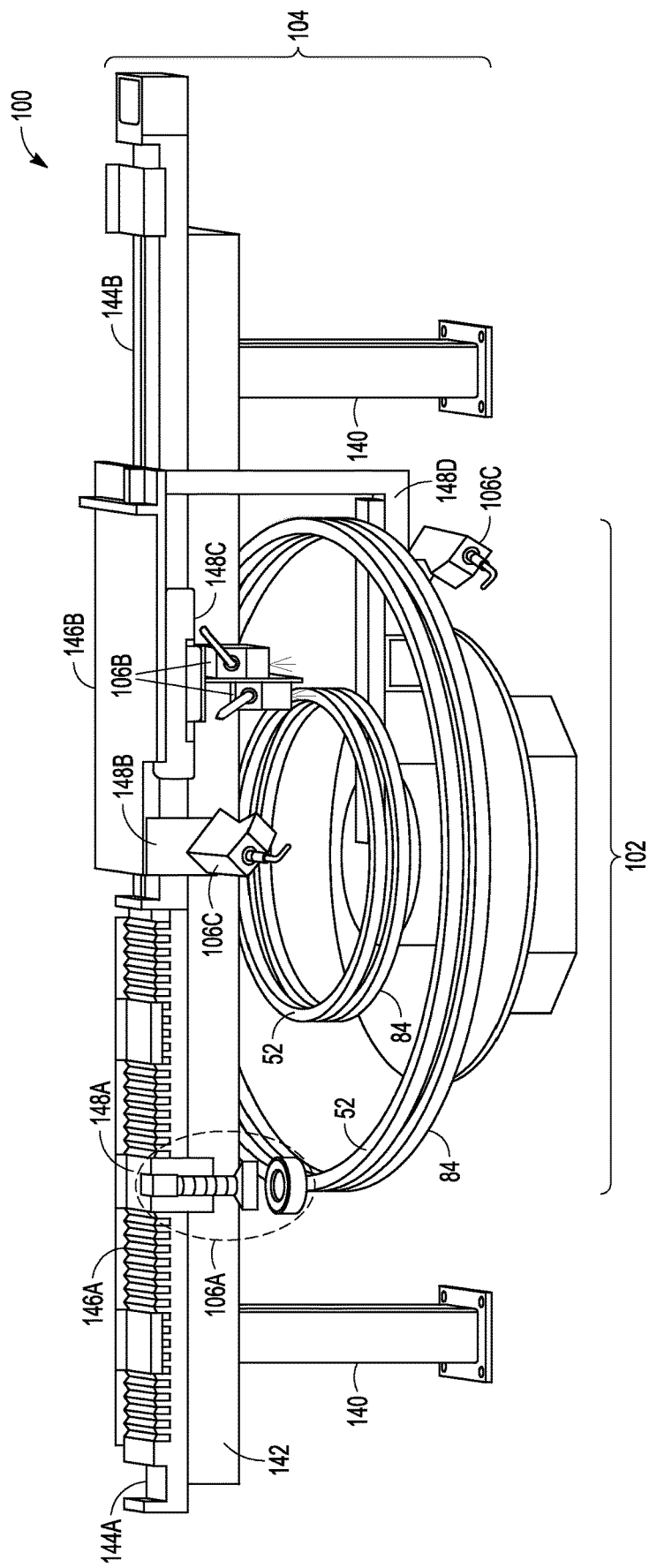
FIG. 5 is perspective view of a seal inspection system, according to one or more embodiments.

Turning now to FIG. 5, an inspection system 100 for inspecting large seal rings is shown. For purposes of showing the versatility of the system, two seal rings 52 are shown to depict the wide range of rings 52 the system may be used to inspect. The inspection system 100 may be particularly adapted for inspecting large seal rings and for performing the inspection in a much shorter amount of time (e.g., 15-50 seconds) than conventional systems. It is to be appreciated that while the present system 100 is well suited for inspecting large seal rings, it may be used for smaller seal rings as well (e.g., 3"-16"). In either case, the inspection system 100 may be configured to receive and hold a seal ring 52 in an inspection position, scan the seal ring, and produce one or more inspection results relating to whether the seal ring meets particular specifications. As shown, the inspection system 100 may include a chuck system 102 (e.g., a means for supporting and rotating a seal ring about a center point), an inspection tool framework 104 (e.g., a means for adjustably supporting the plurality of means for capturing data), and a plurality of inspection tools 106A/B/C (e.g., a plurality of means for capturing data).

Figure 6:
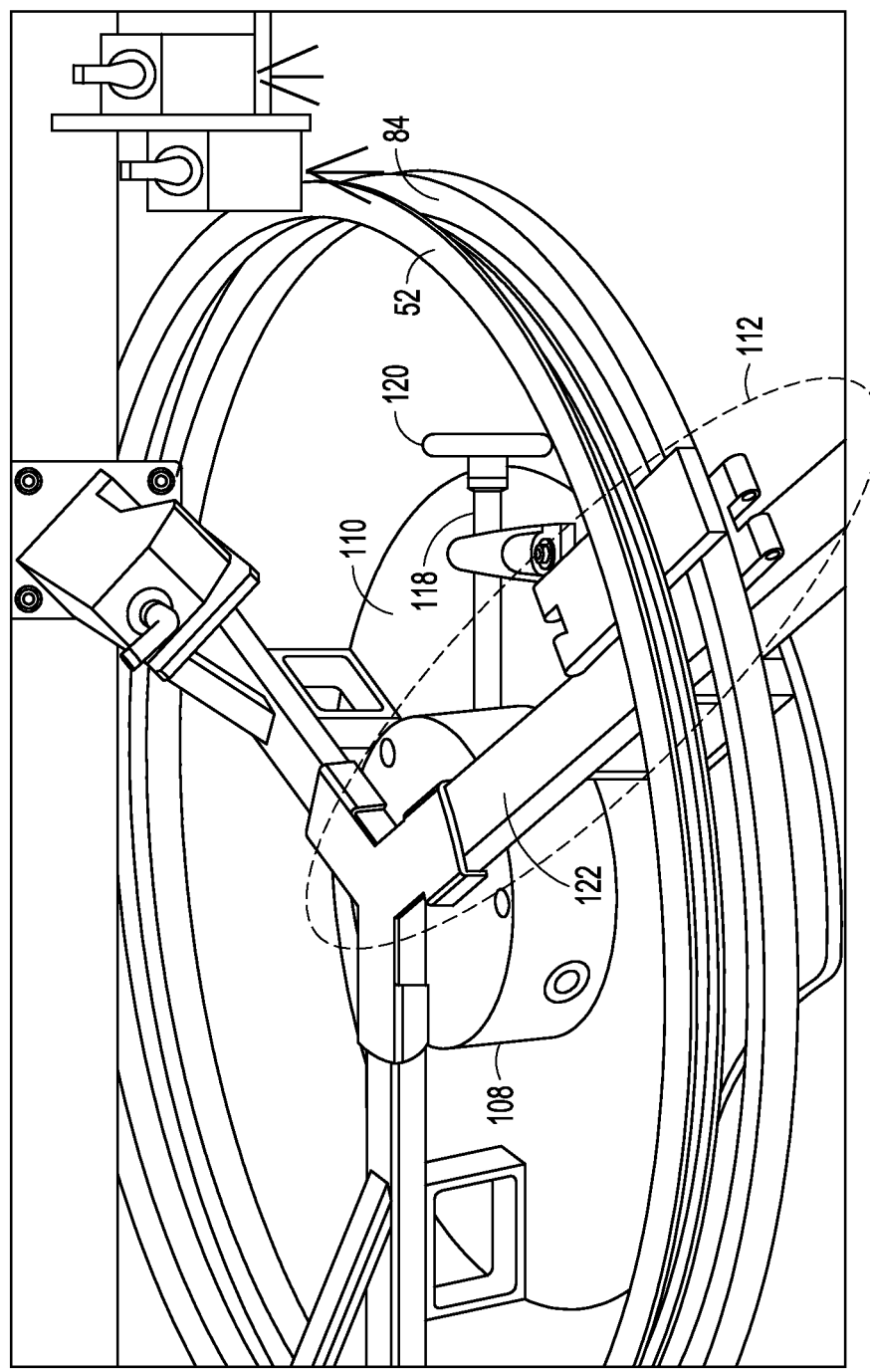
FIG. 6 is close-up perspective view of the system of FIG. 5 showing the chuck system thereof, according to one or more embodiments.

As shown in FIG. 6, the chuck system 102 may be particularly suited for holding the seal ring 52 in a particular position relative to the inspection tool framework 104. That is, the chuck system 102 may include a radially centering chuck 108 that holds the seal ring 52 such that the center of the seal ring 52 is arranged at a center point of the chuck 108 and the center point of the chuck 108 may be arranged at a known position relative to the inspection tool framework 104. The chuck system 102 may include a turntable 110, a centering chuck 108 arranged on the turntable 110, and several jigs 112 for holding the seal ring relative to the centering chuck.

Figure 7:
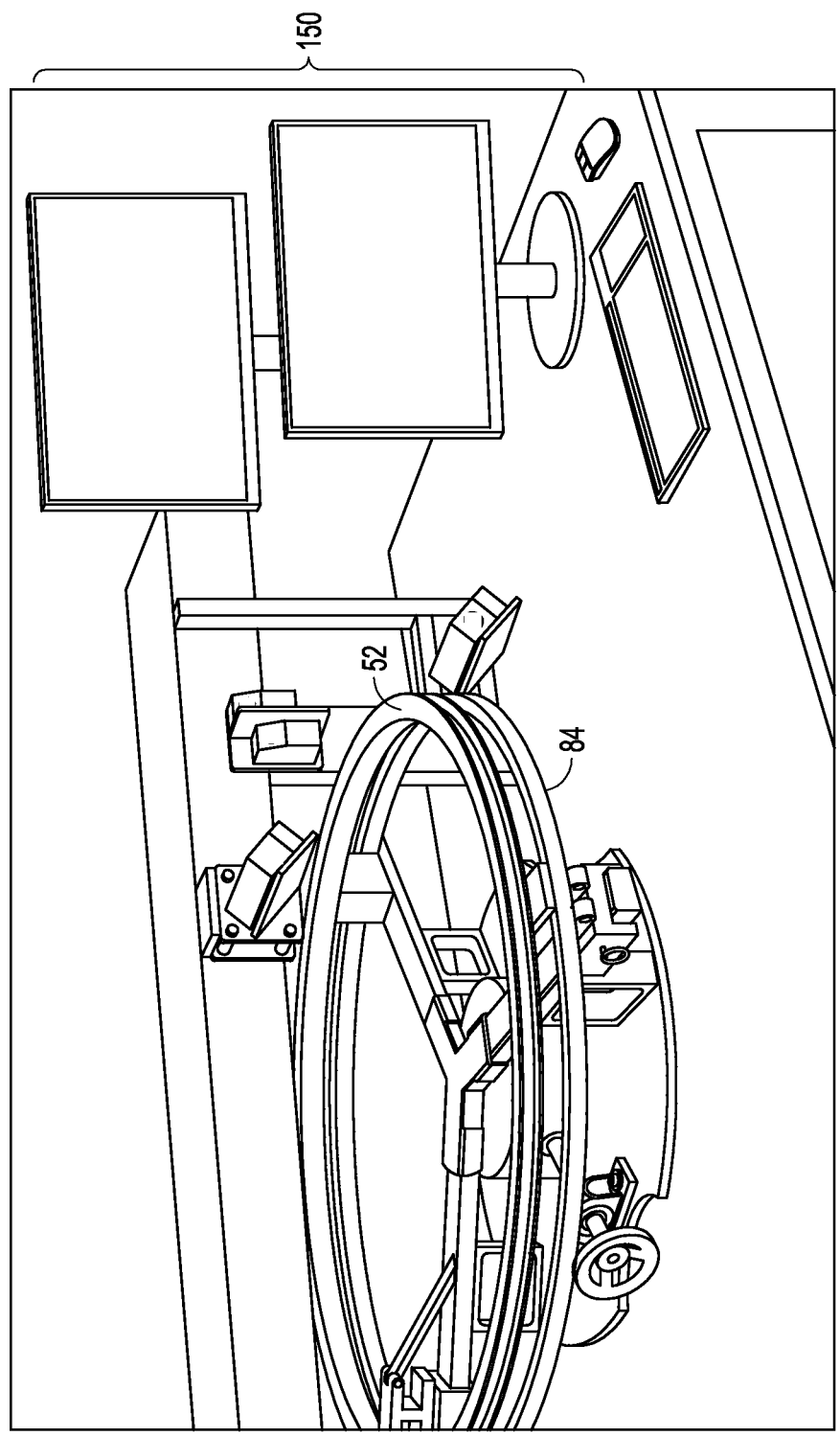
FIG. 7 is a perspective view of the system of FIGS. 5 and 6.
Figure 8:
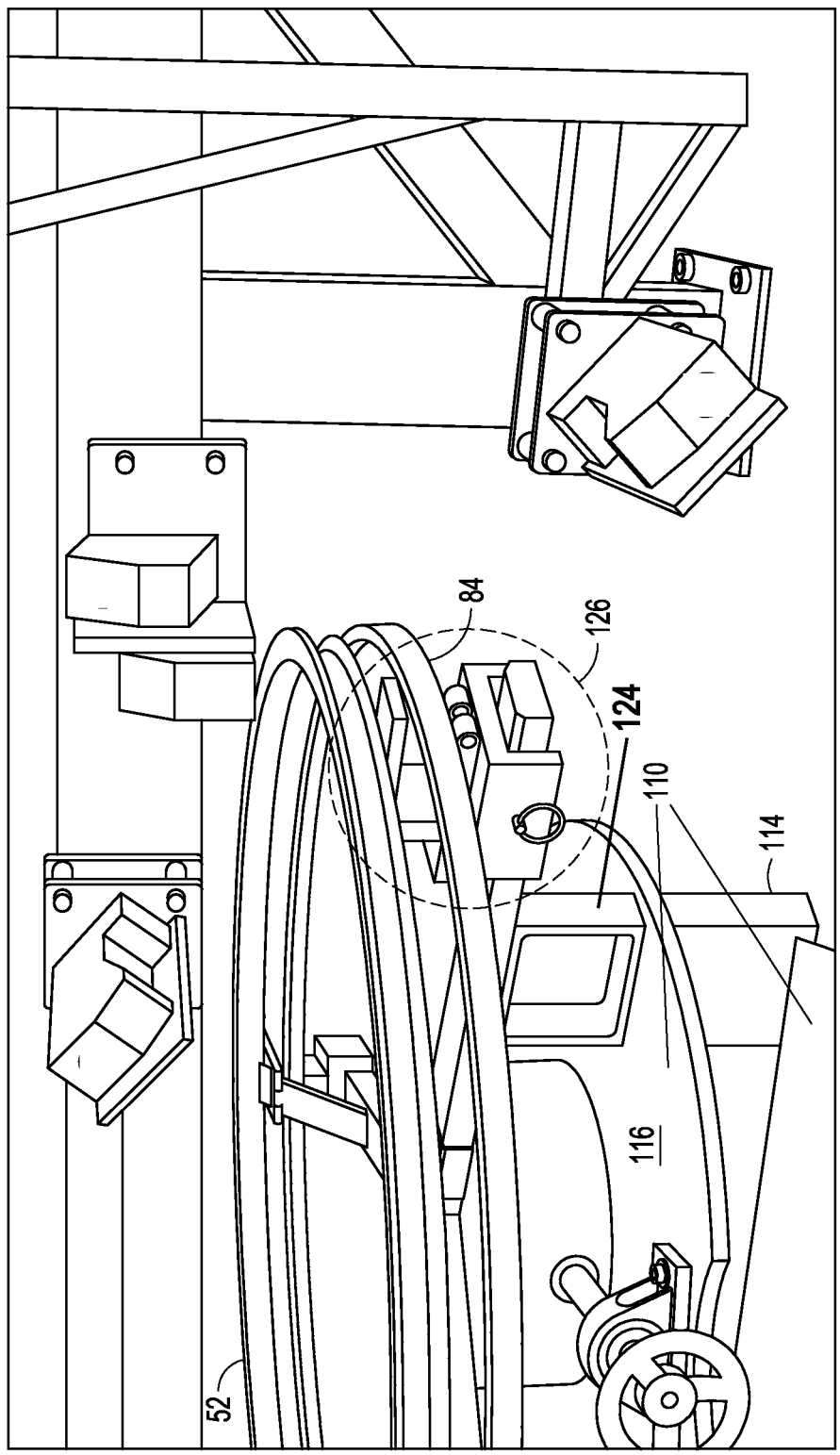
FIG. 8 is a front perspective view thereof depicting a jig supporting a seal ring and a reference ring.

FIG. 7 shows the turntable 110 arranged on a supporting surface such as a work bench or table. The turntable 110 may be adapted to support the centering chuck 108 in a substantially rigid, but rotatable position relative to the supporting surface. More particularly, the turntable may be operable to rotate the centering chuck 108 and, thus, the seal ring 52 about a center point and through a full 360 degree range of motion during the inspection process. As shown in FIG. 8, the turntable 110 may include a base portion or housing 114 including a rotating drive mechanism. The drive mechanism may include a motor and a drive gear system configured to rotate a relatively thick plate 116 arranged on the base portion 114. In one or more examples, a direct-drive motor may be used. The plate 116 may be arranged atop the base portion or housing 114 and supported by a bearing or other mechanism allowing the plate 116 to rotate relative to the base portion, but remain horizontally stable and secured in position relative to a center point about which the rotation occurs.

Referring back to FIG. 6, the centering chuck 108 is shown atop the turntable 110. The centering chuck 108 may be rigidly secured to the turntable 110 so as to rotate with the turntable 110 and, as such, rotate the seal ring 52 with the turntable 110. The centering chuck 108 may be configured for controlled radial adjustment of one or more chuck jaws to which the mentioned jigs 112 may be secured. That is, the chuck 108 may include a control rod 118 with a knob 120 or other handle. The control rod 118 may extend from outside a housing of the centering chuck 108 into the housing to an adjustment system. The adjustment system may be operably coupled between the control rod 118 and the chuck jaws such that rotation of the control knob 120 and rod 118 adjusts the position of the chuck jaws radially toward or away from the center of the centering chuck 108 based on the direction of rotation of the control rod 118.

The jigs 112 are also shown in FIG. 6 as well as FIGS. 7-10. A portion of the jigs 112 may be configured to move radially outward or inward based on the movement of an associated chuck jaw and may extend radially outward away from the centering chuck 108 to support a wide range of sizes of seal rings 52. As shown in FIGS. 6 and 8, the jigs 112 may each include a propped bar 122, a propping element 124, and a ring jaw 126.

The propped bar 122 may include a generally rigid bar that is secured at a first end to a respective chuck jaw on the centering chuck 108 such that the bar moves radially inward and outward along a radial line extending through a center point of the centering chuck 108 when the chuck jaws are adjusted. The bar may have a length selected to support a wide range of seal rings 52 such as rings 52 having diameters ranging from 3 inches to 60 inches, or from 3 inches to 45 inches, or from 3 inches to 37 inches. The ring jaw 126, discussed in more detail below, may have an adjustable position along the length of the bar 122. For this purpose, the bar 122 may include a plurality of adjustment bores 128 (see FIG. 10) extending laterally into and/or through the bar 122 and a pin 130 (see FIG. 9) may be used to secure a respective ring jaw 126 at a given position along the length of the bar 122 by inserting the pin 130 through holes in the ring jaw 126 and through the bores 128 in the bar 122. As such, the ring jaws 126 may be adjusted along the length of the bars 122 (e.g., radially inward or outward) by removing the pin 130, moving the ring jaw 126, and reinserting the pin 130. In one or more examples, the adjustment of the ring jaw 126 along the length of the bar 122 may provide for a coarse adjustment and a fine adjustment may be provided by the chuck control rod 118 and associated mechanisms for adjusting the chuck jaws radially inward or outward.

As shown in FIG. 8, a propping element 124 may function to propan outboard portion of the propped bar 122 relative to the plate 116 on the turntable 110. As shown, the propping element 124 may include one or more upright supports extending upward from the turntable 110 to a height substantially the same as the top of the chuck 108. As such, the propped bar 122 may be arranged substantially horizontally or level when supported at a first end by the chuck 108 and at another point along its length by the propping element 124. In one or more examples, the propping element 124 may include a rectangular frame having a bottom base, two upright supports, and a top member. The propping element 124 may slidingly engage the propped bar 122 to support the bar 122, but allow the bar 122 to translate radially inward and outward with the motion of the chuck jaw.

Figure 9:
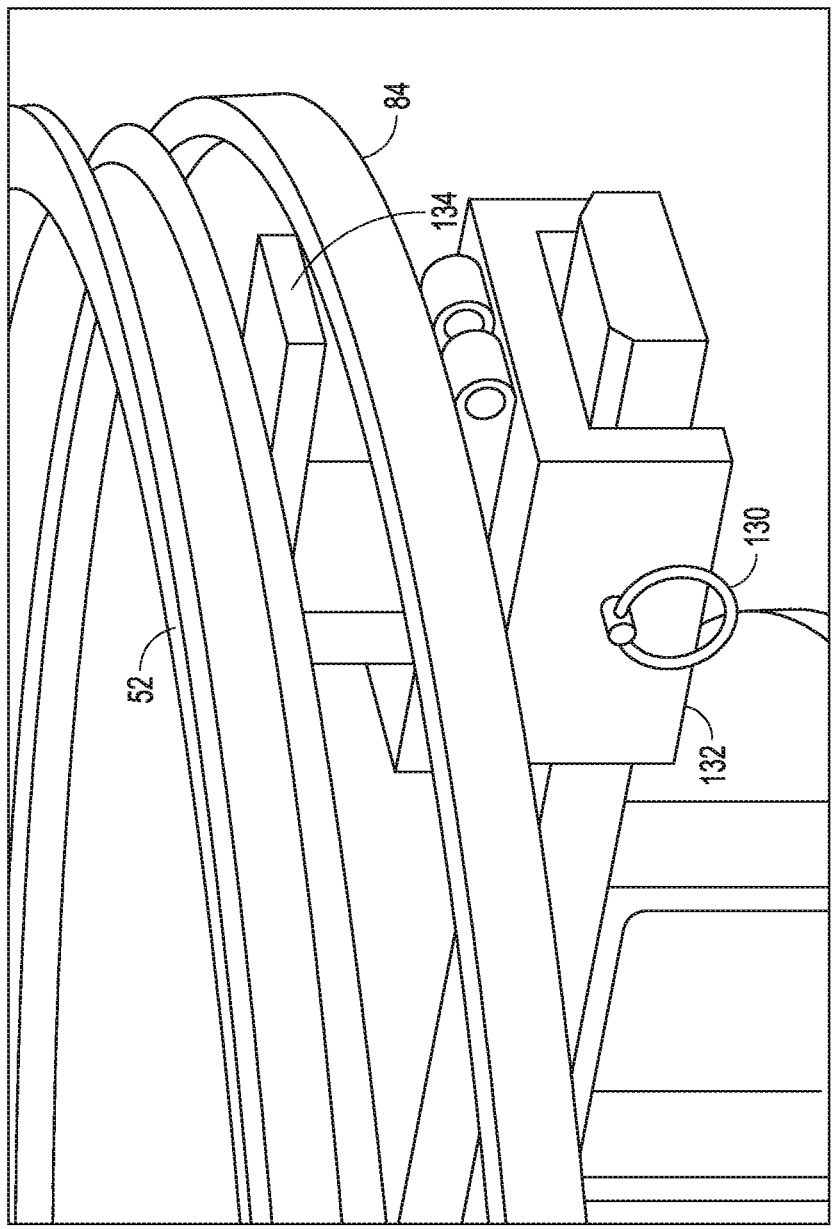
FIG. 9 is a close-up perspective view of a ring jaw of the system of FIGS. 5-8.

The ring jaw 126 of each jig 112 may be arranged along the length of the propped bar 122 at a position selected based on the size of the ring 52 being inspected. The ring jaw 126 may be configured for selective positioning along the propped bar 122 and for supporting and securing the seal ring 52 and a reference ring 84. As shown in FIG. 9, the ring jaw 126 may include a bar engaging channel 132 and a ring support 134.

The bar engaging channel 132 may include an inverted C-shaped channel adapted to slidingly engage the propped bar 122 and control or resist lateral motion of the ring jaw 126 relative to the bar 122. The C-shaped channel may include two downward extending legs that are spaced for arrangement on opposite sides of the bar 122 and a web member extending from a leg on one side of the bar 122 and across the bar 122 to another leg on an opposing side of the bar 122. Each leg may include a bore for receiving the pin 130. The pin 130 may be inserted through the bore of a first leg of the channel 132, extend through a selected adjustment bore of the bar 122 and through a second leg of the channel 132 on an opposite side of the bar 122. The pin 130 may include a spring ball or other mechanism for resisting dislodgment of the pin 130, but allowing removal of the pin when some force is applied.

Figure 10:
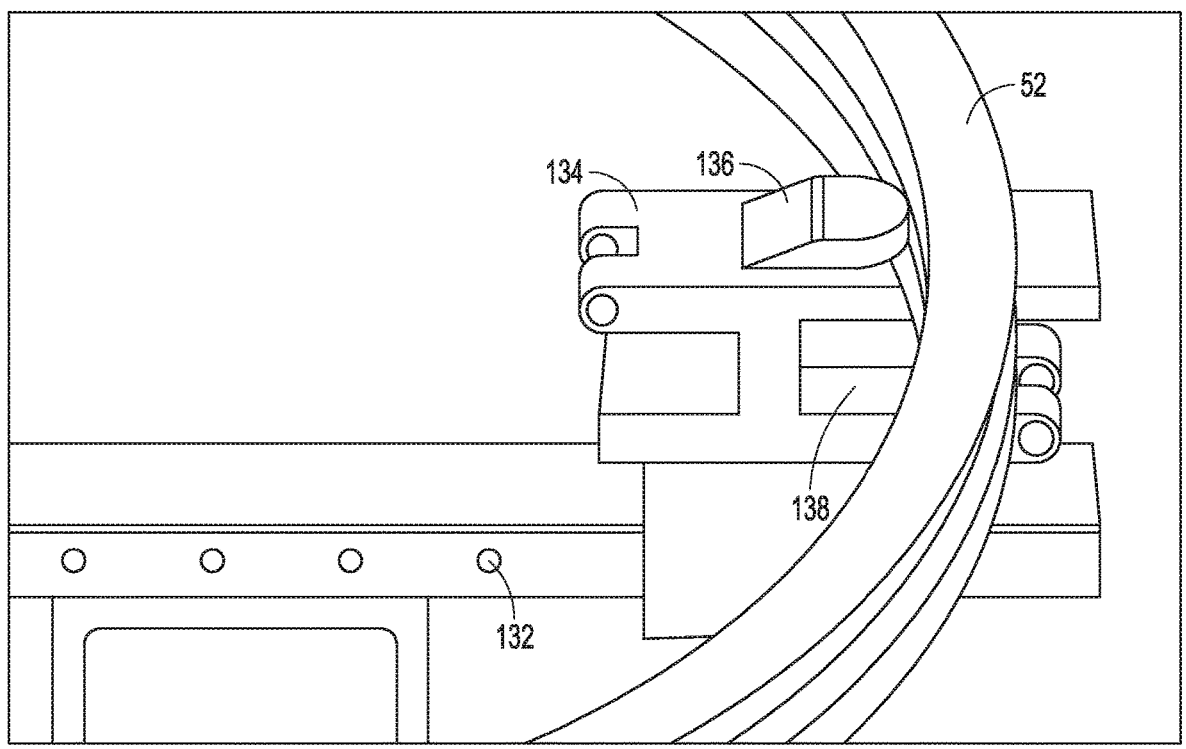
FIG. 10 is an additional perspective view thereof.

AS shown in FIG. 10, the ring support 134 of the ring jaw 126 may be arranged atop the bar engaging channel 132 and may be secured to the bar engaging channel 132. The ring support 134 may be particularly adapted for supporting the seal ring 52 and for controlling the radially inward most position at which a respective portion of the seal ring 52 may be positioned. As such, the collective set of ring jaws 126 and their respective ring supports 134 may hold the seal ring 52 centered with respect to the centering chuck 108. The ring jaw 126 may also be configured for supporting a reference ring 84 and for controlling the radially inward most position at which a respective portion of the reference ring 84 may be positioned. As such, the collective set of ring jaws 126 and their respective ring supports 132 may hold the reference ring 84 centered with respect to the centering chuck 108. As shown, the ring support 134 may be further configured for holding the seal ring 52 and the reference ring 84 generally one above the other such that both are viewable by one or more profile lasers 106C without establishing a shadow on the other ring. To this end, the ring support 134 may include a lower shelf and an upper shelf. The lower and upper shelf may be separated by a vertically extending support generally centered along the shelves and forming an I-shape. As shown in FIG. 10, the upper shelf may include an upwardly extending catch 136 adapted to engage a radially inward facing surface of the seal ring 52 (e.g., the inner face 64 described above) and press lightly outward on the seal ring 52 to hold the radial position of the respective portion of the seal ring 52. Similarly, as shown in FIG. 10, the lower shelf may include an upwardly extending catch 138 adapted to engage an inner surface of the reference ring 84 and press lightly outward on the reference ring 84 to hold the radial position of the respective portion of the reference ring 84. Alternatively, the seal ring 52 may be placed on the lower shelf and the reference ring 84 may be placed on the upper shelf.

Having described the chuck system 102 and with reference again to FIG. 5, the inspection tool framework 104 may be described. As shown, the inspection tool framework 104 may be configured to adjustably support one or more inspection tools 106A/B/C relative to chuck system 102 and, as such, relative to the seal ring 52 and/or reference ring 84. In one or more examples, the framework 104 may include a pair of posts 140 and a laterally extending beam 142. The posts 140 may be secured to a work bench, table, or other supporting surface (e.g., the same supporting surface supporting the chuck system 102). The posts 140 may extend upward to a point at or above the top surface of the centering chuck 108. The laterally extending beam 142 may extend between the two posts 140 generally above the chuck 108 and may be positioned to support inspection tools 106A/B/C. In one or more examples, the posts 140 and laterally extending beam 142 may be offset from the center of the centering chuck 108 such that inspection tools 106A/B/C supported off of a side of the beam 142 are at or near a line extending through the center of the chuck 108 (e.g., when viewed from above). It is to be appreciated that while a particular framework 104 has been described, additional posts and beams may be added to support additional inspection tools and/or to support the tools in different positions.

In addition to a pair of posts 140 and a laterally extending beam 142, the inspection tool framework 104 may include one or more lateral translation systems each including a rail 144A/B, a carriage 146A/B, and a tool supporting bracket 148A/B/C/D. That is, for example, one or more linear actuation systems may be arranged on the beam 142 and may each include a rail 144A/B that is secured to the beam, a carriage 146A/B that slidingly engages the rail 144A/B and is operable to controllably travel along the rail. A bracket 148A/B/C/D for supporting an inspection tool 106A/B/C may be secured to the carriage 146A/B such that controllable motion of the carriage 146A/B adjusts the position of the inspection tool 106A/B/C secured to the carriage 146A/B via the bracket 148A/B/C/D. It is to be appreciated that while a beam has been described as supporting one or more rails, the beam itself may be, incorporate, or otherwise include a rail. Moreover, while a bracket has been described as being secured to a carriage, the carriage itself may be, incorporate, or otherwise include a bracket. For example, rather than having a beam, a rail, a carriage and a bracket, one example system may include a rail and a carriage movable along the carriage where the rail functions to both support the carriage and provide for it to move along the rail. The carriage may function to both move along the rail and support one or more inspection tools. In any case, one or more lateral translation systems may be provided to allow one or more inspection tools to travel along the length of the laterally extending beam or rail.

With continued reference to FIG. 5, in one or more examples, the brackets discussed above may include a camera support bracket 148A and a laser scanner support bracket 148B/C/D. That is, as shown, one or more camera support brackets 148A may be provided to support one or more image-based cameras on one side of the seal ring 52 and one or more laser scanner support brackets 148B/C/D may be provided to support one or more laser scanners on another side of the seal ring 52. The camera support bracket (s) 148A may extend away from the laterally extending beam 142 and provide a connection or support surface for attaching a camera directed in a downward direction toward the top surface of the seal ring 52 or in any desired direction toward the seal ring. The bracket 148A may be adapted to support the camera in a position relatively close to and above the seal ring 52. One or more cameras may be provided on the camera support bracket(s) and, in addition, a light source may be provided to illuminate a portion of the seal ring within the field of view of the camera or cameras.

As shown in FIG. 5 and again in FIG. 7, the laser scanner support bracket 148B/C/D may be adapted to support several laser scanners 106B/C providing for all of the laser scanners 106B/C to move laterally along the beam together as a unit while also providing for relative motion of one or more laser scanners 106B/C relative to one another. The several laser scanners 106B/C may be arranged to generate a cross-sectional profile of the seal ring throughout its entire circumference and to generate a two dimensional diagram of the bandwidth of the seal surface. To this end, two profile laser scanners 106C may be provided and one or more surface laser scanners 106B may be provided.

As shown in FIGS. 5 and 7, the laser scanner support bracket may include two profile laser scanner brackets 148B/D (e.g., a seal/inner side profile laser scanner support bracket and a cone side profile laser scanner support bracket). Each bracket 148B/D may be secured to a common carriage 146B (e.g., a laser scanner carriage) such that the two profile laser scanner brackets 148B/D move together when lateral adjustments are made. In one example, the seal/inner side profile laser scanner support bracket 148B may be the same or similar to the camera support bracket 148A and may be adapted to support a first profile laser scanner 106C in a position above the seal ring 52 and radially inward from the seal ring. The cone side profile laser scanner support bracket 148D may extend downward from the carriage 146B to a position below and radially outward from the seal ring. As shown, the laser scanners 106C on these two brackets 148B/D may face one another and be adapted to capture surface profile data of opposing surfaces of the seal ring 52 and the reference ring 84. Moreover, and together, the seal/inner side profile laser scanner support bracket 148B and the cone side profile laser scanner support bracket 148D may form a C-shape having a mouth and the laser scanners 106C on the brackets 148B/D may be aimed across the mouth where a portion of a seal ring 52 may be arranged.

As shown in FIG. 5 and again in FIG. 8, the surface laser scanner support bracket 148C may be secured to the same carriage 146B (e.g., the laser scanner carriage) as the profile laser scanner brackets 148B/D, but the surface laser scanner support bracket 148C may be adjustable laterally relative to the laser scanner carriage 146B. That is, more than one surface laser scanner 106B may be provided and the surface laser scanner support bracket 148C may include an additional actuator allowing the surface laser scanner support bracket 148C to move laterally relative to the laser scanner carriage 146B such that the surface laser scanners 106B may be adjusted laterally along the beam 142 and relative to the profile laser scanner support brackets 148B/D.

Turning now to the inspection tools 106A/B/C and as alluded to in the discussion of the framework, a plurality of inspection tools may be provided as a part of the system. The inspection tools may be configured for scanning seal rings or other parts for purposes of capturing image data and/or spatial position or profile data. For example, the system may include one or more imaging devices 106A, one or more profile laser scanners 106C, and one or more surface laser scanners 106B. The several devices may be arranged on the inspection tool framework 104 and directed at the seal ring 52 to capture seal ring data.

Figure 11:
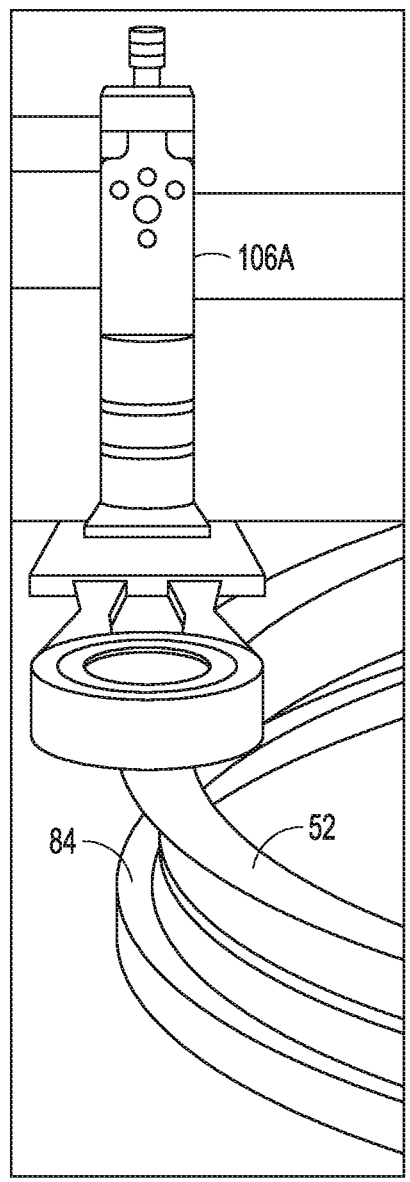
FIG. 11 is a perspective view of an imaging device of the system of FIGS. 5-8, according to one or more examples.

FIGS. 5 and 11 show an imaging device 106A. The imaging device 106A may be particularly arranged and adapted to capture image data relating to the sealing surface 68 of the seal ring 52. Image data of the sealing surface 68 may be useful for identifying surface imperfections on the sealing surface 68 such as scratches, chips, nicks, or other surface imperfections that may affect the seal ring's ability to seal when paired up with an adjacent seal ring. In one or more examples, the imaging device may include a camera such as a Keyence, Cognex, or SICK camera. That is, the imaging device, or means for capturing image data, may be a camera having a photo sensor for capturing a 2D image of a surface of the seal ring. In contrast to the lasers discussed in more detail below, the camera may not include a light emitting laser and may not emit any light except, for example, a flash or illuminating light including several wavelengths of light. The imaging device 106A may be arranged on its respective support bracket 148A (e.g., the camera support bracket) above the seal ring 52 and focused downward on the sealing surface 68 of the seal ring 52. The imaging device 106A may be arranged above the seal ring 52 at a relatively close distance providing the camera with an ability to capture a high resolution image of the seal ring as it passes by the camera due to rotation of the turntable during the inspection process.

As mentioned, the imaging device 106A may also include a light source for illuminating the seal ring during imaging. In one or more examples, this light source may include a light on the camera, which may function with the camera to assist with capturing the image data. Alternatively or additionally, the light source may include a separate light source operable by a controller of the system to illuminate the seal ring during inspection and/or imaging operations. In one or more examples, the light source may be mounted to the camera bracket along with the imaging device and may be arranged to direct light generally downward or at a specific angle so as to illuminate the seal ring within the field of view of the camera.

The profile laser scanners 106C are shown in FIGS. 5-8. The profile laser scanners 106C may be particularly adapted and arranged to capture the profile of the seal ring as it is rotated about the center of the centering chuck 108 during inspection. Given the generally L-shaped nature of the seal ring, two or more laser scanners 106C may be used to capture a full cross-sectional profile of the seal ring throughout the circumference of the seal ring. As discussed with respect to the supporting laser scanner brackets, one laser scanner 106C may be arranged above the seal ring and radially inward from the seal ring and the other laser scanner 106C may be arranged below the seal ring and radially outward of the seal ring. The two laser scanners 106C may be directed toward one another along a relatively straight line defining a ling of sight of the laser scanners. The laser scanners 106C may also be arranged such that the seal ring is arranged along the line of sight. The seal ring may be a generally L-shaped element as described above where the inner face is arranged generally vertically and the sealing surface is arranged generally horizontally. The conical side of the seal ring may be arranged facing generally downward and radially outward. As such, the diagonally arranged laser scanners may provide for the ability to scan a full profile of the cross-section. That is, the upper and radially inward laser scanner may have the inner face and the sealing surface within its field of view and the lower and radially outward laser scanner may have the conical side within its field of view. Similarly, the upper and radially inward scanner may have the inner and upper sides of the reference ring within its field of view, while the lower and radially outward laser scanner may have the outer and lower sides of the reference ring within its field of view. As discussed in more detail below, this may provide for the ability to fully and accurately revolve and piece together the spatial data captured by the laser scanners. In one or more examples, the profile laser scanners may include a Keyence, Cognex, SICK, or Micro Epsilon laser. That is, the profile laser scanners, or means for capturing spatial data, may be laser scanners, for example, that include laser emitters configured to send light pulses of a particularly selected wavelength and at high speed which reflect off objects and return to the scanner's sensor such as a charge coupled device (CCD) or a complementary metal-oxide semiconductor (CMOS). As such, the profile laser scanners may capture discrete three-dimensional data points defining the spatial position of particular aspects of the scanned component (e.g., spatial data) allowing for measuring and/or modeling the seal ring. This may be in contrast to the imaging device, or means for capturing image data, discussed above, which may more simply illuminate the seal ring and capture a 2D image that does not include discrete three-dimensional positional data points.

The surface laser scanner or laser scanners 106B are also shown in FIGS. 5-8. The surface laser scanner 106B may be adapted and arranged to capture spatial data relating to the bandwidth of the sealing surface 68. That is, seal ring pairs 52 may be more effective when the bandwidth of the sealing surfaces of each ring are generally or approximately the same. As such, the bandwidth of a seal ring 52 may be specified for falling within particular tolerances. The surface laser scanner 106B may provide for determining whether the sealing surface meets those tolerances.

As shown, the surface laser scanner 106B may be arranged on the surface laser scanner support bracket 148C and may be arranged in a manner much the same as the imaging device 106A. That is, the surface laser scanner 106B may be arranged above the seal ring and directed downward to place the sealing surface of the seal ring in the field of view of the surface laser scanner 106B. The surface laser scanner 106B may be arranged in relatively close proximity to the sealing surface providing the laser scanner with an ability to capture high resolution spatial data of the sealing surface as it passes by the laser scanner due to rotation of the turntable during the inspection process. In one or more examples, the surface laser scanner may include a Keyence, Cognex, SICK, or Micro Epsilon laser. That is, the surface laser scanner may be the same type of device as the profile laser scanners, but may be arranged, oriented, and directed differently and/or calibrated differently. For example, the surface laser scanner may be arranged, oriented, directed, and/or calibrated to capture data about a surface as opposed to a cross-sectional profile. In one or more examples, multiple surface laser scanners may be provided. That is, for example, depending on the size of the sealing surface and the position of the surface laser scanner, some sealing surfaces may extend beyond the field of view of the surface laser scanner and a separate surface laser scanner that may be spaced further above the seal ring may be used to capture the bandwidth data. In this circumstance the additional surface laser scanner may be moved into position relative to the laser scanner carriage by adjusting the position of the surface laser scanner bracket and aligning the surface laser scanner above the seal ring.

As shown in FIG. 7, a control system 150 may be provided for controlling the chuck system, the inspection system framework, and the inspection tools. In one or more examples, the turntable, the centering chuck, the actuation mechanisms on the laterally extending beam, and the operation of the inspection tools may each be controlled by the control system. For example, the control system may be adapted to position the camera carriage along the laterally extending beam to place the seal ring in the field of view of the camera. The control system may also adjust the laser scanner carriage along the laterally extending beam to arrange the line of sight of the profile laser scanners such that it intersects the seal ring. This may naturally position the surface laser scanner in position above the seal ring or, if an alternative surface laser scanner is used, the surface laser scanner position may be adjusted to be aligned above the seal ring. The control system may also be configured for performing the inspection. For example, the control system may receive a part number of the seal ring to be inspected. Based on the known size of the seal ring from the part number, the control system may adjust the several devices mentioned above to place them in position for inspecting the seal ring. The control system may also activate the several laser scanners, the imaging device, and/or any lighting to begin the inspection or scanning process. The control system may also activate the turntable to rotate the seal ring through a full 360 degree range while operating the scanners and imaging devices and capturing the data from the several devices. Once the scanning is complete, the control system may also function to analyze the data and compare several aspects of the data to a series of tolerance levels to determine whether each aspect of data fails to meet or meets the specified tolerances. The analysis may include revolving the captured profile data of the seal ring based on a corresponding center defined by the reference ring data using a method described below. The control system, or control means, may include a computing device equipped with hardware and software for performing the claimed method and input and output devices such as a display, a keyboard, a mouse, and/or other input devices for inputting part information, activating the inspection process, and receiving the inspection results in visual form.

INDUSTRIAL APPLICABILITY

Figure 12:
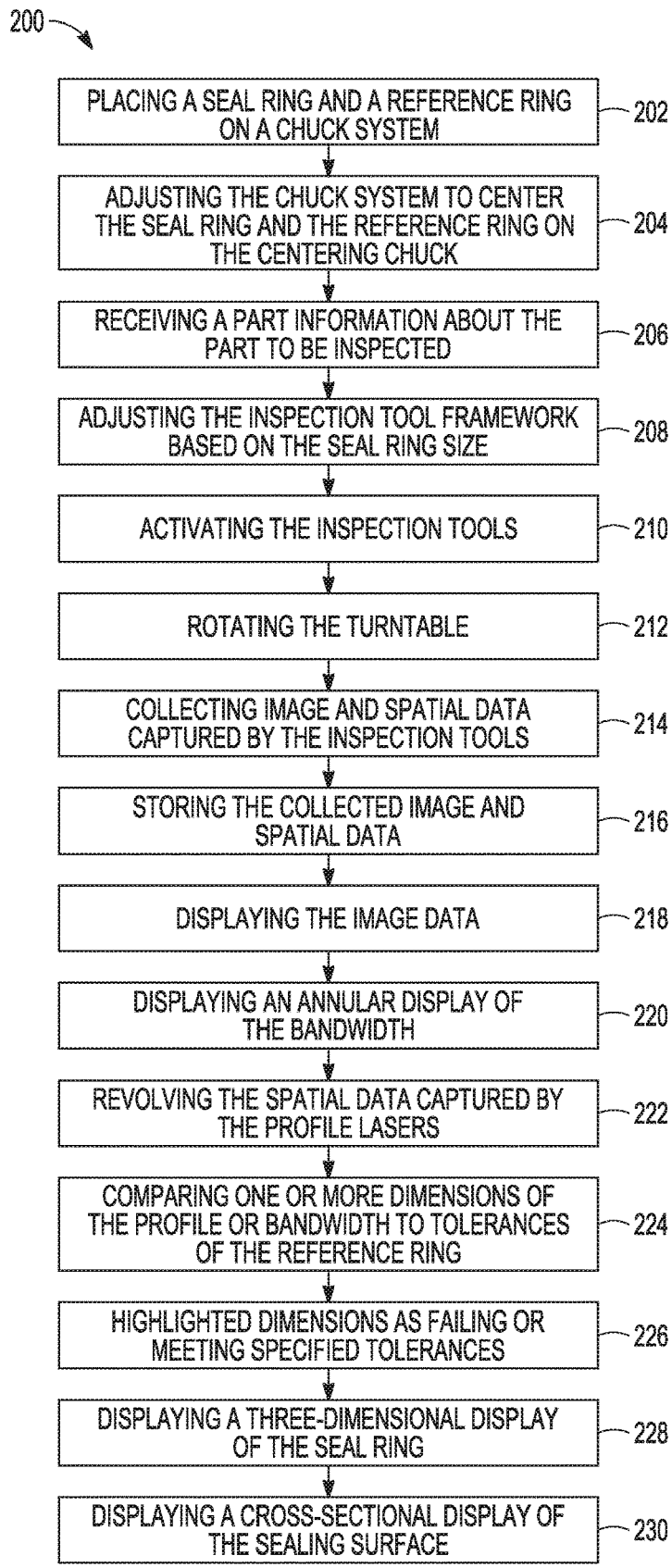
FIG. 12 is a diagram depicting method steps for inspecting a seal ring, according to one or more examples.

In operation and use, and as shown in FIG. 12, a method 200 of inspecting a seal ring may be provided. The method may include placing a seal ring and a reference ring on a chuck system 202 and adjusting the chuck system to center the seal ring and the reference ring on the centering chuck 204. It is to be appreciated that adjusting the chuck system may include adjusting the ring jaws before, after, or both before and after the seal ring and reference ring are placed. For example, the ring jaws may be adjusted along the propped bars to generally accommodate the seal ring size that is to be inspected before the seal ring and/or reference ring are placed. Once the seal ring and reference ring are placed, further adjusting of the centering chuck may be performed by rotating the adjustment rod to draw the seal ring and the reference ring into a more refined position. In one or more examples, the I-shaped nature of the ring jaws may be such that when the reference ring is placed, the ring jaw may be adjusted inward, the reference ring may be aligned with the space between the upper and lower plates on the ring jaw, and the ring jaw may be adjusted outward while receiving the reference ring. Moreover, adjustment of the ring jaw may include removing and replacing the pin to allow for movement and securitization of the ring jaw along the propped bar. In one or more examples, the adjustment of one or more aspects of the chuck system may be performed automatically based on entry of a part number into the control system. For example, a motor may be provided on the centering chuck to adjust chuck jaws to a selected position based on a part number input, which may identify the size or diameter of the seal ring.

The method may also include receiving part information about the part to be inspected 206. That is, the control system may prompt the user to input a part number, part size, or other input providing the general size of the seal ring such that the control system may properly adjust the position of the inspection tools. In one or more examples, the part number or size may include receiving and/or entering a diameter of a seal ring or entering a part number or other identifying information and looking up or otherwise deriving the diameter of the seal ring from the part number.

The method may also include adjusting the inspection tool framework based on the seal ring size 208. For example, the camera carriage may be adjusted along the length of the laterally extending beam to align the camera or other imaging device above the seal ring based on the size of the seal ring. The laser scanner carriage may also be adjusted to align the line of site of the profile laser scanners to pass diagonally through the seal ring and to align the surface laser scanner above the seal ring. In one or more examples, aligning the surface laser scanner above the seal ring may include adjusting the position of the surface laser scanner relative to the laser scanner carriage to utilize one of two or more surface laser scanners.

The method may also include activating the inspection tools 210, which may include bringing the imaging devices and the laser scanners to an alerted or active state as well as illuminating the seal ring at the imaging device by activating a light source at the imaging device. The method may also include rotating the turntable 212 to rotate the full circumference of the seal ring passed each of the inspection tools and collecting image and spatial data captured by the inspection tools as the seal ring rotates 214. The method may also include storing the collected image and spatial data 216. The method may also include displaying the image data 218 such that an operator may review and consider any imperfections on the sealing surface captured by the imaging device. The method may also include displaying an annular display of the bandwidth 220 and showing any deviations from a desired or specified bandwidth. The method may also include revolving the spatial data captured by the profile laser scanners 222. Revolving the data may include calculating a center point of the rotation based on the known geometry of the reference ring as compared to the captured spatial data of the reference ring. The combination of the spatial data from the two profile laser scanners in conjunction with centering information from the reference ring may allow for revolving the otherwise linear spatial data captured by the profile laser scanner to create a digital version of the annularly shaped seal ring. One or more dimensions of the profile, bandwidth, or other captured dimensions may be compared 224 to tolerances of the reference ring and may be highlighted 226 as failing or meeting specified tolerances. In one or more examples, a three-dimensional display of the seal ring may be provided. The display may include a digital image of the seal ring and relevant dimensions, their values, and an indication of failing or meeting tolerances may be provided. In still other examples, the method may include displaying a cross-sectional display 230 of the sealing surface. Still other post-inspection analyses may be performed and displays may be provided based on the captured images and spatial information.

The above detailed description is intended to be illustrative, and not restrictive. The scope of the disclosure should, therefore, be determined with references to the appended claims, along with the full scope of equivalents to which such claims are entitled.

What is claimed is:

1. A seal ring inspection system, comprising:
a chuck system configured for securing a seal ring for rotation about a longitudinal axis that extends in an up/down direction and through a center point;
an inspection tool framework arranged about the chuck system and configured to adjustably support a plurality of inspection tools relative to the seal ring; and
a plurality of inspection tools adjustably arranged on the inspection tool framework, the inspection tools comprising:
a camera arranged above the chuck system and directed downward to capture an image of a sealing surface of the seal ring arranged on the chuck system; and
a plurality of laser scanners comprising:
a surface laser scanner including a laser emitter for emitting laser light at the seal ring that is reflected in the form of reflected laser light and a sensor configured for capturing the reflected laser light, the surface laser arranged above the chuck system and directed downward to capture discrete three-dimensional data points that define the sealing surface of the seal ring arranged on the chuck system; and
a pair of diagonally directed profile laser scanners including a laser emitter for emitting laser light at the seal ring that is reflected in the form of reflected laser light and a sensor configured for capturing the reflected laser light, the pair of diagonally directed profile laser scanners collectively configured for capturing discrete three-dimensional data points that define a full three-dimensional profile of the seal ring.

2. The system of claim 1, wherein the inspection tool framework comprises a laser scanner carriage and the profile laser scanners are secured to the laser scanner carriage with one or more brackets.

3. The system of claim 2, wherein the one or more brackets support a first of the pair of profile laser scanners above and radially inward from the seal ring and support a second of the pair of profile laser scanners below and radially outward from the seal ring.

4. The system of claim 3, wherein the pair of profile laser scanners are directed at one another along a line of sight.

5. The system of claim 4, wherein, during inspection, the line of sight passes through the seal ring.

6. The system of claim 2, wherein the surface laser scanner is secured to the laser scanner carriage.

7. The system of claim 6, wherein the surface laser scanner is adjustable relative to the laser scanner carriage.

8. The system of claim 7, wherein the surface laser scanner comprises two surface laser scanners.

9. The system of claim 8, wherein the two surface laser scanners are positioned at different heights above the chuck system.

10. The system of claim 1, wherein the chuck system comprises a turntable configured to rotate the seal ring for inspection.

11. The system of claim 1, wherein the chuck system comprises a plurality of chuck jaws, a plurality of propped bars extending from each of the plurality of chuck jaws, and a plurality of ring jaws arranged on each of the plurality of propped bars.

12. The system of claim 11, wherein the plurality of propped bars each include a bar extending radially away from a respective chuck jaw of the plurality of chuck jaws and a propping element supporting the bar along a length thereof.

13. The system of claim 11, wherein the plurality of ring jaws are configured to support a seal ring and a reference ring.

14. The system of claim 13, wherein the ring jaws are I-shaped.

15. A method for inspecting a seal ring, comprising:
receiving or obtaining a seal ring dimension indicative of the seal ring size;
adjusting a position of a carriage supporting a camera;
adjusting a position of a carriage supporting a plurality of laser scanners including a surface laser scanner and a pair of profile laser scanners;
operating a turntable to rotate the seal ring relative to the camera and the plurality of laser scanners;
using the camera, capturing an image of the seal ring during the operating of the turntable;
using the surface laser scanner, capturing spatial bandwidth data including discrete three-dimensional data points that define the bandwidth of the sealing surface of the seal ring during the operating of the turntable;
using the pair of profile laser scanners, capturing spatial profile data including discrete three-dimensional data points that define a cross-sectional profile of the seal ring;
comparing at least one of the spatial bandwidth data and the spatial profile data to a specified value; and
determining whether the at least one of the spatial bandwidth data and the spatial profile data fails or meets the specified value.

16. The method of claim 15, further comprising, using the pair of profile laser scanners, capturing spatial reference ring data including discrete three-dimensional data points that define the profile of the reference ring.

17. The method of claim 16, further comprising revolving the spatial profile data based on the spatial reference ring data.

18. The method of claim 15, further comprising displaying the image the sealing surface and an annular depiction of the spatial bandwidth data.

* * * * *